United States Patent
Bertsche et al.

(10) Patent No.: US 11,506,280 B2
(45) Date of Patent: Nov. 22, 2022

(54) METHOD AND PROGRAM PRODUCT FOR OPERATING A DRIVE TRAIN

(71) Applicant: Universität Stuttgart, Stuttgart (DE)

(72) Inventors: Bernd Bertsche, Stuttgart (DE); Zeljana Beslic, Böblingen (DE); Yvonne Gretzinger, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 666 days.

(21) Appl. No.: 16/527,801

(22) Filed: Jul. 31, 2019

(65) Prior Publication Data

US 2020/0040987 A1 Feb. 6, 2020

(30) Foreign Application Priority Data

Aug. 3, 2018 (EP) .................................... 18187377

(51) Int. Cl.
*F16H 61/12* (2010.01)
*F16H 59/68* (2006.01)

(52) U.S. Cl.
CPC ............. *F16H 61/12* (2013.01); *F16H 59/68* (2013.01); *F16H 2061/1256* (2013.01)

(58) Field of Classification Search
CPC ... F16H 59/68; F16H 61/12; F16H 2061/1256
See application file for complete search history.

(56) References Cited

U.S. PATENT DOCUMENTS

| | | | |
|---|---|---|---|
| 2002/0116108 A1 | 8/2002 | Grob et al. | |
| 2007/0135260 A1* | 6/2007 | Bianchi | B60K 17/28 |
| | | | 477/94 |
| 2015/0052985 A1 | 2/2015 | Brenner et al. | |
| 2015/0114758 A1* | 4/2015 | Casals Terre | F16H 57/043 |
| | | | 184/6.12 |

(Continued)

FOREIGN PATENT DOCUMENTS

| | | |
|---|---|---|
| DE | 10102773 A1 | 7/2002 |
| DE | 10 2010 002376 A1 | 9/2011 |
| DE | 102011117468 A1 | 5/2013 |

(Continued)

OTHER PUBLICATIONS

European Patent Office; Search Report in related European Patent Application No. 18 187 377.9 dated Oct. 25, 2018; 1 page.

(Continued)

*Primary Examiner* — Edwin A Young
(74) *Attorney, Agent, or Firm* — Dorton & Willis, LLP

(57) ABSTRACT

A method for operating a drive train having a power generator, a mechanical power transmission device, and a power receiver wherein the power transmission device is monitored to detect mechanical damage and/or the development of mechanical damage to the power transmission device, wherein detected damage and/or detected damage development is localized and the power generator, the power transmission device, and/or the power receiver are/is controlled such that a mechanical load at the localized damage location and/or damage development location is selectively reduced.

(Continued)

A program product including program code sections with which such a method is feasible when the program product is executed on a programmable controller, a computer, or other programmable device.

6 Claims, 1 Drawing Sheet

(56) References Cited

U.S. PATENT DOCUMENTS

2015/0177098 A1* 6/2015 Brandstrom ............ F16H 57/01
702/41

FOREIGN PATENT DOCUMENTS

| DE | 102015210911 A1 | 12/2016 |
| DE | 102016222660 A1 | 5/2018 |
| WO | 2009/133161 A2 | 11/2009 |

OTHER PUBLICATIONS

European Patent Office; Office Action in related European Patent Application No. 18 187 377.9 dated Dec. 9, 2021; 7 pages.

* cited by examiner

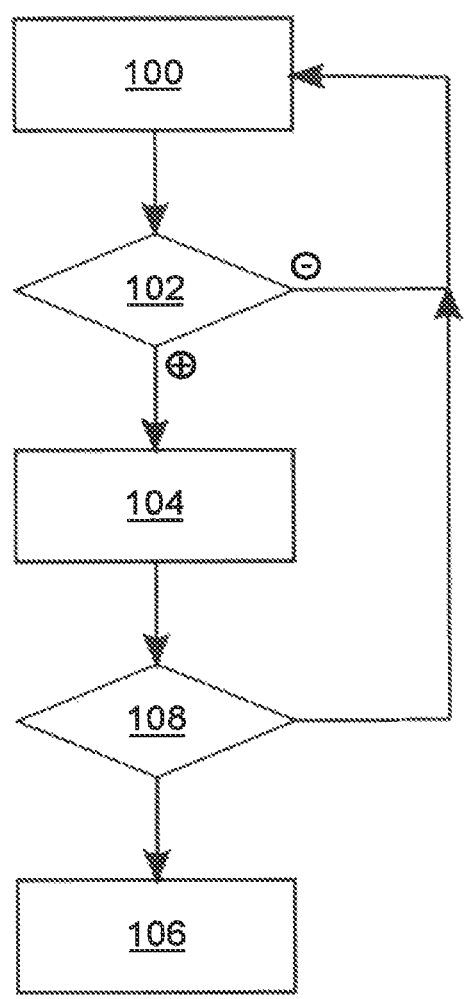

METHOD AND PROGRAM PRODUCT FOR OPERATING A DRIVE TRAIN

CROSS-REFERENCE TO RELATED APPLICATIONS

This application claims the benefit of priority under 35 U.S.C. § 119(a) to European Patent Application EP 18 187 377.9, filed Aug. 3, 2018 (pending), the disclosure of which is incorporated by reference in its entirety.

TECHNICAL FIELD

The invention relates to a method for operating a drive train with a power generator, a mechanical power transmission device, and a power receiver, wherein the power transmission device is monitored in order to detect mechanical damage and/or the development of mechanical damage to the power transmission device. Moreover, the invention relates to a corresponding program product.

BACKGROUND

Published German Application DE 10 2011 117 468 A1 discloses a method for monitoring the state of a drive train, in particular of a wind energy plant, which comprises at least one component mechanically connected to a rotating element of the drive train, on which at least one acceleration sensor is arranged at a distance from an axis of rotation of the drive train, which sensor rotates at a distance around the axis of rotation of the drive train, wherein a signal from the at least one acceleration sensor of the at least one component is time-captured at at least one rotational speed of the rotating element and examined for interference frequencies which correspond to damage in the drive train. The time-captured signal is examined for interference frequencies that correspond to at least gear damage, damage to the planetary gear, and/or bearing damage. The time-captured signal is examined for bearing frequencies, in particular for the cage rotation frequency with a fixed outer ring, the cage rotation frequency with a fixed inner ring, the rollover frequency of an irregularity on the outer ring, the rollover frequency of an irregularity on the inner ring, the rolling element rotation frequency, and/or the rollover frequency of a rolling element irregularity on both roller tracks.

Published German Application DE 10 2015 210 911 A1 describes a method for detecting deviations and/or changes in at least one operating state of an electrically, in particular electromotively, operated drive, in particular for detecting a presence and/or an occurrence and/or a development of damage, preferably mechanical damage to such a drive, comprising the following steps: Measuring of at least one electrical current supplied to the electrically operated drive for supplying electrical energy; performing a time-frequency analysis and/or an amplitude and/or effective value determination of the at least one measured electrical current; comparing a frequency spectrum obtained from the time-frequency analysis of the at least one measured electrical current with a predefinable frequency spectrum; comparing an amplitude value and/or effective value obtained from the determination of the amplitude and/or effective value determination of the at least one measured electrical current with a predefinable amplitude value or effective value; triggering of an error signal when a deviation of a predeterminable magnitude is determined when comparing the acquired frequency spectrum and/or amplitude value and/or effective value with a specifiable frequency spectrum and/or amplitude value and/or effective value. The error signal triggers and/or controls an intervention in an operation of the electrically, in particular electromotively, operated drive, in particular an at least partial decommissioning of the electrically, in particular electromotively, operated drive.

According to DE 10 2015 210 911 A1, the decommissioning takes place in the simplest case by completely switching off the drive that was detected as faulty, but depending on the detected type of error, different forms of decommissioning may be provided. For example, if it is detected that a wear limit of the affected drive is exceeded in a transitional time interval, an error message may be sent, but operation may continue in a decelerated manner to avoid greater impairments of the performance of system parts surrounding or interacting with the affected drive. It is also possible, however, to switch off the system immediately as soon as a destruction of a component of the drive is detected.

The object of the invention is to improve a method mentioned above. Another object of the invention is to improve a program product mentioned above.

SUMMARY

The object is achieved with an exemplary method as disclosed herein. In addition, the object is achieved with an exemplary program product as disclosed herein.

The method may be performed by using a program, a computer, and/or another programmable device. The drive train may be a drive train of a wind power plant. The drive train may be a power train. The power train may be a power train of a vehicle. The vehicle may be a motor vehicle. The vehicle may be an engine-powered vehicle, a hybrid electric vehicle, or an electric motor vehicle. The power generator may serve to deliver a mechanical power. The power generator may be a rotor, a motor, an engine, an internal combustion engine, or an electric motor.

The power transmission device may serve to transmit a mechanical power. The mechanical power may be determined by a torque and/or a rotational speed. The power transmission device may serve to convert a mechanical power. The power transmission device may be a transmission. The transmission may be a mechanical transmission. The transmission may be a fixed gear transmission or a manual transmission. The transmission may be a gearbox. The transmission may be a gear transmission. The transmission may be a planetary gear. The transmission may have shafts and/or gears.

The power receiver may serve to remove a mechanical power. The power receiver may be a generator or a drivable vehicle wheel. The power transmission device may be arranged in the drive train between the power generator and the power receiver and/or operated there. Mechanical power may flow from the power generator to the power receiver via the power transmission device. A power flow direction may be reversible. The power transmission device may undergo a cycling.

The power transmission device may be monitored by using sensors such as acceleration sensors, structure-borne sound sensors, vibration sensors, position sensors, rotational position sensors and/or speed sensors, signals that are present independently of sensors such as voltage and/or torque of an electric motor, and/or a computer or other programmable device. Sensors may be used to provide sensor signals. The sensor signals and/or the signals that are independent of sensors may be available to the computer or the other programmable device. The sensor signals and/or the signals that are independent of sensors may be evaluated by means of the computer or the other programmable device in order to detect mechanical damage and/or the development of mechanical damage to the power transmission device. The sensor signals and/or the signals that are independent of sensors may be evaluated by means of the computer or the other programmable device in order to localize detected damage and/or a detected damage development. The power generator, the power transmission device, and/or the power receiver may be controlled by the computer or the other programmable device. The power generator, the power transmission device, and/or the power receiver may have at least one controllable actuator. The at least one actuator may be controlled by the computer or the other programmable device. "Controlling" in the present case refers in particular to controlling by control technology and/or control engineering.

Detected damage and/or a detected damage development may be localized according to its rotation angle or rotation angle range. The rotation angle range may be less than approximately 90 degrees, in particular less than approximately 60 degrees, in particular less than approximately 30 degrees, in particular less than approximately 20 degrees, in particular less than 10 degrees, in particular less than 5 degrees.

The mechanical stress at the localized site of damage and/or site of damage development may be reduced in correlation to the localized site of damage and/or site of damage development. The mechanical stress at the localized site of damage and/or site of damage development may be reduced periodically. The periodicity may be correlated with localized damage and/or localized damage development. The periodicity may be correlated with a speed of the power generator, the power transmission device, and/or the power receiver. For example, the power generator may be controlled such that reduced mechanical power is delivered in correlation with the localized damage location and/or damage development location.

The power generator, the power transmission device, and/or the power receiver may be controlled such that a predetermined total output power is at least approximately maintained. For example, the power generator may be controlled such that, in correlation with the localized damage location and/or damage development location, a reduced and otherwise increased mechanical power is delivered.

The power transmission device may have machine elements that are rotatable or revolving around an axis of rotation. The power transmission device may include machine elements that are in rolling contact with each other. The machine elements may be bearings. The bearings may be rolling bearings. The rolling bearings may have rolling elements and running surfaces for the rolling elements. The rolling contact may be present between the rolling elements and the running surfaces. The power transmission device may have gears in rolling contact with each other. The machine elements may be gears. The gears may have teeth. The teeth may have tooth flanks. The rolling contact may be present between the tooth flanks of engaging teeth. The rolling contact may be associated with a compression. The power transmission device may be monitored to detect and locate rolling contact-related damage and/or the development of rolling contact-related damage on the machine elements such as bearings and/or gears. Rolling contact-related damage may occur as a result of continuous loading and unloading. Rolling contact-related damage may consist of dimpled depressions. Such depressions may also be referred to as pittings.

The power generator, the power transmission device, and/or the power receiver may be controlled in such a way that a mechanical load at the localized damage location and/or damage development location is reduced precisely at the correct tooth group or tooth. The load reduction may be correlated with a resolution with which damage locations and/or damage development locations can be localized. The load may be reduced in such a way that the localized damage location and/or damage development location is relieved with a specified certainty.

The program product may be stored on a storage medium. The storage medium may be a data carrier. The program product may be present as a signal. The signal may be transmitted in a wired and/or wireless manner. The storage medium and/or the signal may be computer readable. The other programmable device may be an electrical control device. The computer or other programmable device may be used to control machinery, equipment, and other technical processes.

In summary and in other words, the invention thus provides, among other things, a control strategy for the targeted relief of moving machine elements in the event of damage. The control strategy is part of a protective method and may produce a targeted relief on the basis of a topographical change of a surface of a rolling power transmission interface within machine elements moved relative to one another. The relief may take place at the interface of the topographical change of the surface, which is detected by a sensor device, by a singular reduction of a load. The reduction may take place by means of an actuator device, which leads to a reduction of a pressing force of a surface pressure pattern within the basic setting. Within a control loop, the transmitted pressing forces may deviate from the default setting mainly at a power transmission interface having local topological changes. A number of teeth and a number of the tooth of the gear damaged by the dimples may form the input parameters of the control strategy within a transmission. By localizing damage with the help of known diagnostic techniques, it is now possible to bring about a specific reduction of the torque at a specific damage location to relieve a damaged tooth flank so that a Hertzian pressure distribution locally decreases without or at least with only slight losses of total power. The relief may occur on both the drive and the output side. For example, on the drive side, a control strategy may be stored in an engine control unit which transmits output signals via a closed control for a tooth-specific, point-specific reduction of an engine torque to actuators.

The word "may" refers in particular to optional features of the invention. Accordingly, there is one embodiment of the invention, each having the respective feature or features.

The invention improves operability. An operational performance is improved. The progression of damage is delayed. Downtime is deferred and/or reduced. Maintenance work, engineering work, production work, time, and/or costs are reduced. A required load capacity may be reduced. A protective mode may increase the service life or a tooth width may be reduced for the same service life, manufacturing tolerances/toothing corrections may be increased, and/or corrections with regard to acoustics may be optimized.

Below, an embodiment of the invention is described in further detail with reference to FIGURES. Further features and advantages are outlined in this description. The specific features of this embodiment may represent general features of the invention. Features associated with other features of this embodiment may also represent individual features of the invention.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

FIG. 1 is a schematic flowchart illustrating an exemplary method in accordance with the principles of the present disclosure.

DETAILED DESCRIPTION

FIG. 1 shows schematically and by way of example a control strategy for the targeted relief of machine elements in rolling contact with each other in case of damage.

Starting from a normal operation 100, a power transmission device having machine elements in rolling contact with each other, such as bearings and/or gears, is monitored to detect mechanical damage and/or the development of mechanical damage.

The power transmission device operates in a mechanical power flow between a power generator and a power receiver. In normal operation 100, the power transmission device has no detectable mechanical damage and no detectable development of mechanical damage. In normal operation 100, the power generator is controlled in such a way that over a total rotation angle range of 360 degrees a predetermined output power is at least approximately constantly available to the extent the power generator is capable of providing it.

If the monitoring 102 indicates that there is no damage and/or no damage is developing, normal operation 100 will continue.

If the monitoring 102 indicates that there is damage and/or damage is developing, a localization 104 of the damage location and/or damage development location takes place. The damage location and/or damage development location is localized depending on its angle of rotation. A damaged tooth of a gear or a tooth in danger of becoming damaged is identified.

After the localization 104, a switch to a protective mode 106 instead of the normal operation 100 is made. In the protective mode 106, the power generator and/or the power receiver is/are controlled in such a way that a mechanical load is reduced in the rotation angle range of the damage location and/or a damage development location. In the other rotation angle ranges, the predetermined output power may be left unchanged or increased in order to at least approximately maintain a total output power across the entire rotation angle range of 360 degrees.

Optionally, damage and/or damage development may be assessed qualitatively. If the evaluation 108 indicates that the damage and/or damage development are/is below a predetermined limit, normal operation 100 may be maintained. If the evaluation 108 indicates that the damage and/or damage development is above a predetermined limit, the protective mode 106 may be initiated. The protective mode 106 may be controlled in consideration of the evaluation 108 in order to quantitatively adapt a power reduction to the damage and/or damage development. In this case, the controlling may also include a tooth-specific query for dimples and an adapted local reduction at the dimple and local increase at healthy teeth.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE NUMERALS

100 Normal operation
102 Monitoring
104 Localization
106 Protective mode
108 Evaluation

What is claimed is:

1. A method for operating a drive train having a power generator, a mechanical power transmission device, and a power receiver, the method comprising:
    monitoring the power transmission device to detect at least one of a current mechanical damage or a developing mechanical damage to the power transmission device;
    identifying a location of the current damage or developing damage according to an angle or range of angles of rotation of the power transmission device; and
    controlling at least one of the power generator, the power transmission device, or the power receiver such that a mechanical load is selectively reduced at the identified current damage location or the developing damage location.

2. The method of claim 1, wherein controlling at least one of the power generator, the power transmission device, or the power receiver comprises controlling such that a predetermined total output power is at least approximately maintained.

3. The method of claim 1, wherein:
    the power transmission device includes machine elements in rolling contact with each other; and
    monitoring and identifying the location comprises monitoring to detect and identify the location of at least one of rolling contact-related damage or a developing rolling contact-related damage to the machine elements.

4. The method of claim 1, wherein:
    the power transmission device includes gears in rolling contact with each other; and
    monitoring the power transmission device comprises monitoring to detect and identify the location of at least one of rolling contact-related damage or developing rolling contact-related damage to the gears.

5. The method of claim 4, wherein controlling at least one of the power generator, the power transmission device, or the power receiver comprises controlling such that the mechanical load acting on at least one of the identified damage location or the developing damage location is reduced at a specific tooth group or tooth.

6. A program product for operating a drive train having a power generator, a mechanical power transmission device, and a power receiver, the program product having program code stored on a non-transitory, computer-readable medium, the program code, when executed by a computer, causing the computer to:
    monitor the power transmission device to detect at least one of a current mechanical damage or a developing mechanical damage to the power transmission device;
    identify a location of the current damage or developing damage according to an angle or range of angles of rotation of the power transmission device; and
    control at least one of the power generator, the power transmission device, or the power receiver such that a mechanical load is selectively reduced at the identified current damage location or the developing damage location.

* * * * *